United States Patent
Donolo et al.

(10) Patent No.: US 11,218,103 B2
(45) Date of Patent: Jan. 4, 2022

(54) INDUCTION MOTOR SLIP CALCULATION (71) Applicant: Schweitzer Engineering Laboratories, Inc., Pullman, WA (US)

(72) Inventors: Marcos A. Donolo, Pullman, WA (US); Jay Hartshorn, Moscow, ID (US); Subhash C. Patel, West Chester, PA (US); Vinod K. Yedidi, King of Prussia, PA (US); Jianchun Qin, Norristown, PA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/066,860

(22) Filed: Oct. 9, 2020

(65) Prior Publication Data

US 2021/0111653 A1    Apr. 15, 2021

Related U.S. Application Data (60) Provisional application No. 62/914,448, filed on Oct. 12, 2019.

(51) Int. Cl.
*H02P 21/18* (2016.01)
*H02P 23/08* (2006.01)

(52) U.S. Cl.
CPC .............. *H02P 21/18* (2016.02); *H02P 23/08* (2013.01)

(58) Field of Classification Search
CPC .................................. H02P 21/18; H02P 23/08
See application file for complete search history.

(56) References Cited

U.S. PATENT DOCUMENTS

| | | |
|---|---|---|
| 4,218,718 A | 8/1980 | Sun |
| 4,547,826 A | 10/1985 | Premerlani |
| 4,659,973 A | 4/1987 | Stich |
| 4,743,818 A | 5/1988 | Quayle |
| 4,761,703 A | 8/1988 | Kliman |
| 4,914,386 A | 4/1990 | Zocholl |
| 5,030,917 A | 7/1991 | Kliman |
| 5,086,264 A | 2/1992 | Kelledes |
| 5,436,784 A | 7/1995 | Schweitzer, III |
| 5,539,601 A | 7/1996 | Farag |
| 5,793,595 A | 8/1998 | Schweitzer, III |
| 6,042,265 A | 3/2000 | Kiliman |
| 6,172,509 B1 | 1/2001 | Cash |
| 6,308,140 B1 | 10/2001 | Dowling |
| 6,356,421 B1 | 3/2002 | Guzman-Casillas |

(Continued)

FOREIGN PATENT DOCUMENTS

| | | |
|---|---|---|
| WO | 2008116966 | 10/2008 |
| WO | 2011076263 | 6/2011 |
| WO | 2016037711 | 3/2016 |

*Primary Examiner* — Zoheb S Imtiaz
(74) *Attorney, Agent, or Firm* — Stoel Rives LLP; Richard M. Edge (57) ABSTRACT

An intelligent electronic device (IED) according to the present disclosure can estimate a full load rotor resistance value as a function of motor positive-sequence resistance. The IED may estimate the full load rotor resistance value by measuring zero-crossings of voltage after a motor disconnect. The IED may also acquire motor current and voltage measurements and calculate motor slip using the acquired motor current and voltage measurements and the estimated full load rotor resistance value.

19 Claims, 7 Drawing Sheets

(56) References Cited

U.S. PATENT DOCUMENTS

| | | |
|---|---|---|
| 6,456,946 B1 | 9/2002 | O'Gorman |
| 6,757,146 B2 | 6/2004 | Benmouyal |
| 6,856,115 B2 | 2/2005 | Branecky |
| 7,123,457 B2 | 10/2006 | Schweitzer, III |
| 7,161,778 B2 | 1/2007 | Zocholl |
| 7,336,455 B2 | 2/2008 | Dimino |
| 7,675,720 B1 | 3/2010 | Zocholl |
| 8,310,196 B2 * | 11/2012 | Ams ............... H02H 7/0844 |
| | | 318/798 |
| 8,725,451 B2 | 5/2014 | Whitefield |
| 9,151,802 B2 | 10/2015 | Donolo |
| 9,176,024 B2 | 11/2015 | Jensen |
| 9,939,492 B2 | 4/2018 | Patel |
| 10,298,168 B2 | 5/2019 | Donolo |
| 2007/0035398 A1 | 2/2007 | Vesel |
| 2010/0301792 A1 | 12/2010 | Tiwari |
| 2014/0118865 A1 * | 5/2014 | Kakihara ............ G01R 31/343 |
| | | 361/23 |
| 2015/0311849 A1 | 10/2015 | Zhang |
| 2016/0061507 A1 * | 3/2016 | Penn, II ............. H02P 29/028 |
| | | 318/461 |
| 2016/0094178 A1 * | 3/2016 | Dietz ................. H02P 29/62 |
| | | 318/400.02 |
| 2016/0156300 A1 * | 6/2016 | Nakamura ............ B65H 7/20 |
| | | 271/256 |
| 2016/0204674 A1 * | 7/2016 | Chen ................ H02P 29/0241 |
| | | 318/432 |
| 2017/0372928 A1 * | 12/2017 | Yamada ............ H01L 21/67103 |
| 2018/0059793 A1 * | 3/2018 | Hajati ............... H02K 33/02 |
| 2019/0158010 A1 | 5/2019 | Donolo |
| 2021/0152111 A1 * | 5/2021 | Zhou ................. H02P 21/22 |

* cited by examiner

INDUCTION MOTOR SLIP CALCULATION

RELATED APPLICATION

This application claims the benefit under 35 U.S.C. § 119(e) of U.S. Provisional Application No. 62/914,448 filed Oct. 12, 2019, which is hereby incorporated by reference herein in its entirety.

TECHNICAL FIELD

The present disclosure relates generally to determining a speed of an induction motor.

BRIEF DESCRIPTION OF THE SEVERAL VIEWS OF THE DRAWINGS

Additional aspects and advantages will be apparent from the following detailed description of preferred embodiments, which proceeds with reference to the accompanying drawings, in which.

To easily identify the discussion of any particular element or act, the most significant digit or digits in a reference number refer to the figure number in which that element is first introduced.

DETAILED DESCRIPTION

The speed of an induction motor can be used for many applications. For example, the speed of the induction motor can be used by motor relays for thermal protection and locked rotor detection. For instance, the motor relay may use the speed to estimate the temperature of the induction motor and shut off the motor if the temperature is above a certain threshold. If the induction motor is not spinning or spinning slower, then the induction motor heats up faster than if the induction motor is rotating at a faster speed. Further, an increase in the rotational speed of the induction motor also increases cooling of the induction motor. Thus, both heating and cooling of the induction motor may be dependent on the speed of the induction motor.

In order to accurately determine the speed of the motor, some protection devices (e.g., motor relays) may use sensors or an encoder on the shaft of the induction motor. However, sensors and encoders add cost and complexity. Further, encoders and sensors add an additional point of failure, thus reducing the reliability of the induction motor.

Some embodiments herein calculate the speed in real time using motor current and voltage measurements rather than using other sensors and encoders. More specifically some embodiments compute the slip of the induction motor, which is the differences between the synchronous speed of the motor and the actual speed at which the motor is rotating.

To be able to calculate the speed using current and voltage measurements some embodiments use a model of the induction motor. The model may include several parameters including a full load rotor resistance value. These parameters may be input by a user, however relying on user input may introduce inaccuracies into the system which may make protection mechanisms less effective. Instead of relying on user input, some embodiments herein may estimate induction motor model parameters based on measured current and voltages when the induction motor is first started-up and when the induction motor is disconnected.

The phrases "coupled to," "connected to," and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

As used herein, the term intelligent electronic device (IED) may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term IED may be used interchangeably to describe an individual IED or a system comprising multiple IEDs. The frequency tracking devices and systems described herein may be a component of an IED or in communication with a separate IED.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor need the steps be executed only once, unless otherwise specified.

Figure 1:
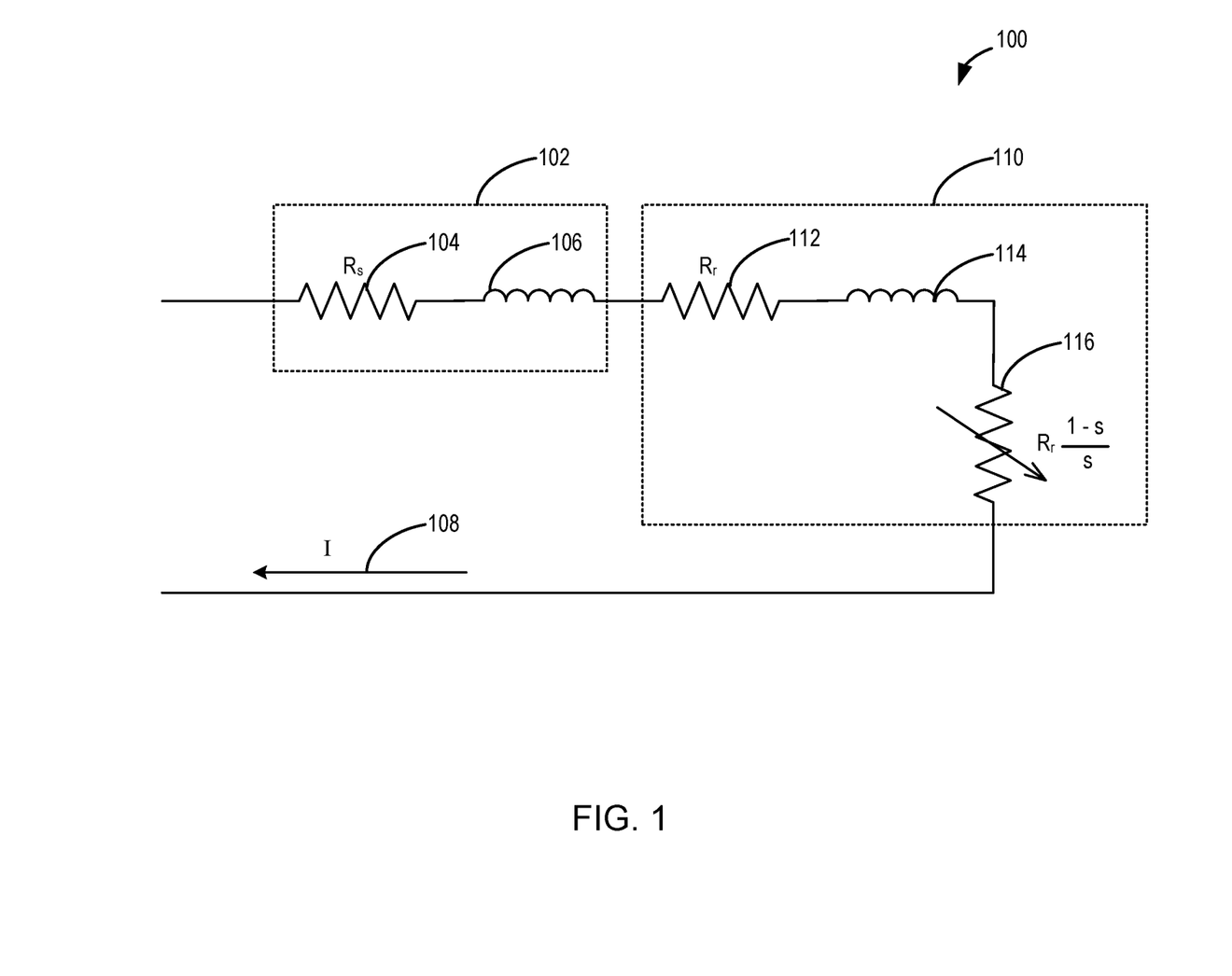
FIG. 1 illustrates a schematic diagram of an induction motor model in accordance with one embodiment.

FIG. 1 illustrates a schematic diagram of an induction motor model 100. The induction motor model 100 includes a stator model 102 and a rotor model 110. As shown, the stator model 102 may include a stator resistance ($R_s$) 104 and a stator inductance 106.

The rotor model 110 may include a rotor resistance ($R_r$, which is included in a static rotor resistance component 112 and variable rotor resistance component 116) and a rotor inductance 114. The variable rotor resistance component 116 may change with a speed of the induction motor and represents how much mechanical power is leaving the motor. The "s" shown in FIG. 1 refers to the slip of the induction motor.

In some embodiments, a slip calculating IED may compute the slip of the induction motor in real time from the positive sequence resistance values of the induction motor model 100 and from three induction motor parameters obtained from the induction motor manufacturer or testing. The induction motor parameters may include the locked rotor torque (LRQ) the locked rotor current, and the full load slip of the induction motor. Additionally, some embodiments of the slip calculating IED may utilize the positive sequence resistance values and a baseline induction motor run (motor start, run, and stop) to compute some of the motor parameters required to estimate the motor slip. This would allow the slip calculating IED to calculate the slip with fewer motor parameters provided by user input.

The positive sequence resistance values may be directly derived from current measurements 108 and voltage measurements. The slip calculating IED may measure the current measurements 108 and voltage measurements at the terminals of the motor. The positive sequence resistance includes the stator resistance 104, the static rotor resistance 112, and the variable rotor resistance 114.

While the motor is energized, the slip calculating IED may compute the positive sequence resistance of the motor from the positive sequence voltage and currents and varies with the speed/slip of the motor and can be represented as $R_p(s)$ where:

$$R_p(s) = R_s + R_r + R_r\left(\frac{1-s}{s}\right) \quad \text{Equation 1}$$

Where:
s is the slip of the machine,
$R_s$ is the resistance of the stator, and
$R_r$ is the resistance of the rotor.

The positive sequence resistance of the motor as a function of the slip, $R_p(s)$, (Equation 1) may be simplified as shown below.

$$R_p(s) = R_s + R_r\left(1 + \frac{1-s}{s}\right) \quad \text{Equation 2}$$

$$R_p(s) = R_s + R_r\left(\frac{s+1-s}{s}\right) \quad \text{Equation 3}$$

$$R_p(s) = R_s + \frac{R_r}{s} \quad \text{Equation 4}$$

As shown, the positive sequence resistance of the motor, $R_p(s)$, is a function of the slip so $R_p(s)$ will change with the speed of the induction motor.

The slip calculating IED may also model the variations of $R_r(s)$ with respect to the slip as:

$$R_r(s) = R_1 \cdot s + R_0(1-s) \quad \text{Equation 5}$$

Where:
s is the slip of the machine,
$R_0$ is the full load rotor resistance, and
$R_1$ is the lock rotor resistance.
Using Equation 5 for $R_r(s)$ in Equation 4 would yield:

$$R_p(s) = R_s + \frac{R_1 \cdot s + R_0(1-s)}{s} \quad \text{Equation 6}$$

Here note that in Equation 6, when s=1:

$$R_p(1) = R_s + R_1 \quad \text{Equation 7}$$

The slip calculating IED may measure $R_p(1) = R_s + R_1$ at the beginning of the start sequence of an induction motor (e.g., measured when the motor is just connected). The slip calculating IED may also find $R_0$ using other procedures detailed below. Using $R_1$ and $R_0$, the slip calculating IED may determine the slip of the induction motor using the following equation:

$$S = \frac{1}{\frac{R_p(s) - (R_S + R_1)}{R_0} + 1} \quad \text{Equation 8}$$

In some embodiments, the slip calculating IED estimates $R_0$ to be a fraction of $R_p(1)$. For example, in some embodiments $R_0$ may be determined by calculating $$R_0 = K(R_p(1)) \quad \text{Equation 9}$$

Where: K is ⅓
The slip computed using this K factor may have the potential to have larger slip errors for small slip values. However, the slip may still be useful for locked rotor detection and for thermal model applications. Alternatively, the $R_0$ may be determined based on measurements after the induction motor is disconnected. The following figures and description of the same describe logic for determining a more accurate $R_0$ using measurements after the induction motor has been disconnected.

Figure 2:
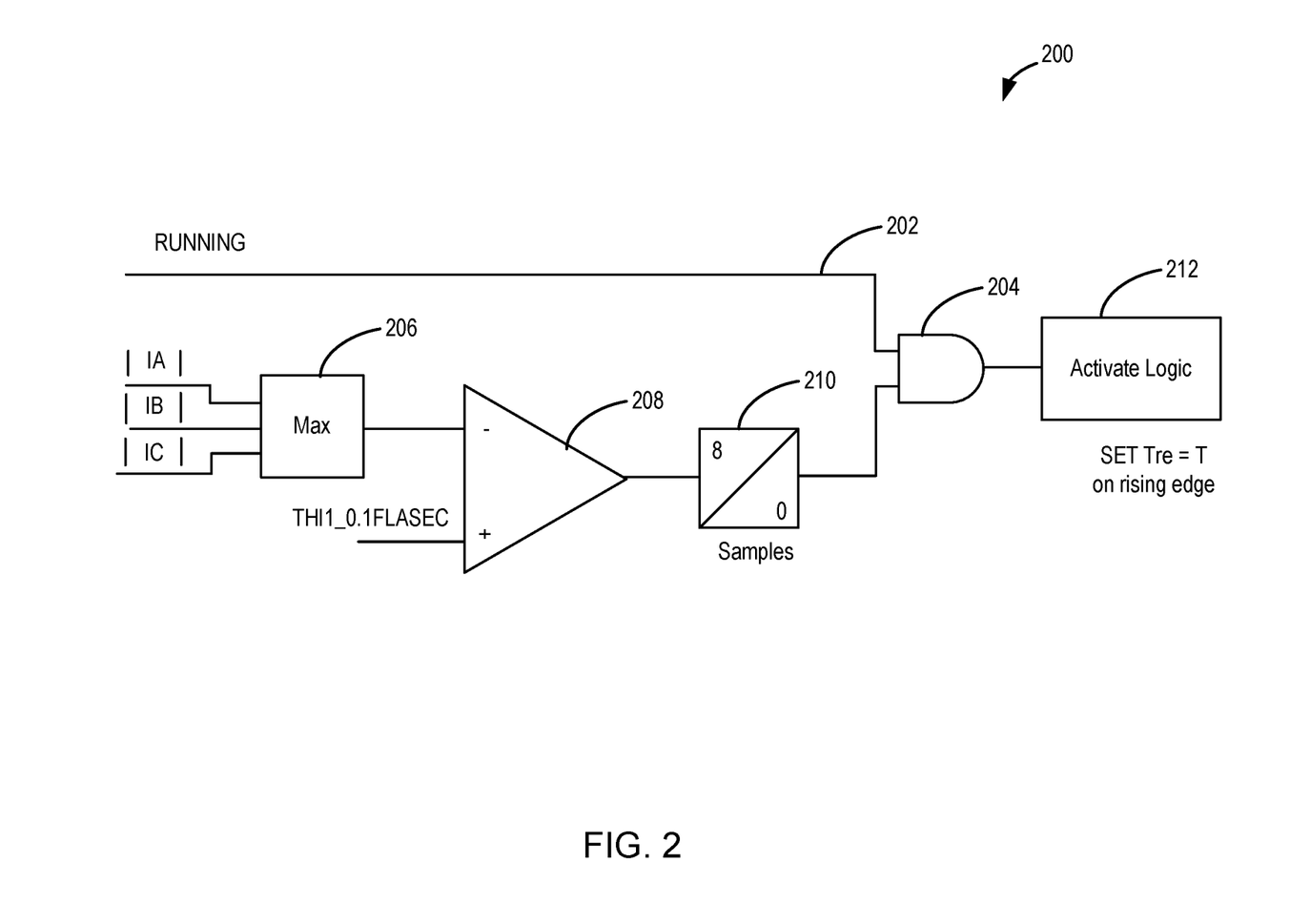
FIG. 2 illustrates a schematic of a circuit for detecting a motor stop in accordance with one embodiment.

FIG. 2 illustrates a schematic of an activation circuit 200 for detecting a motor stop. The motor stop occurs when the motor is disconnected from current. When the activation circuit 200 detects the motor stop, the activation circuit 200 may send a signal 212 to activate the logic of FIG. 3 to determine the full load rotor resistance ($R_0$).

The activation circuit 200 comprises an AND gate 204, a current maximum element 206, a comparator 208, and a timer 210. The AND gate 204 determines when to send the signal 212 to activate the logic to determine the full load rotor resistance ($R_0$). The AND gate 204 receives two signals, a running signal 202 and a signal indicating that the current has been disconnected. Thus, when the motor is still running and the current has been disconnected, the activation circuit 200 determines that a motor stop (i.e., the current has been disconnected from a running motor) has occurred.

To determine when the power was disconnected, the current maximum element 206 may receive the absolute value of each phase's current and determine the maximum value of the three currents. The current maximum element 206 then sends the maximum current value to the comparator 208. The comparator 208 compares the maximum current value to a threshold. In some embodiments, this threshold may be set to 0.1 amps to account for nominal current. If the maximum current value is below the threshold, the timer 210 begins to count a number of samples below the threshold. If a target number of samples is reached the timer 210 provides the AND gate 204 with a true or high value.

For example, in the illustrated embodiment, the timer 210 collects eight samples before signaling the AND gate 204. In some embodiments, where the activation circuit 200 takes 32 current samples per cycle, this would mean that the timer 210 would wait to send the signal until a quarter of a cycle has been below the current threshold.

The desire to determine when the motor stop occurs relates to the motor slip. If the slip calculating IED knows exactly when the motor is disconnected, the frequency at the time of disconnection may be used as the slip/speed of the motor.

When the activation circuit 200 determines a motor stop (e.g., on every rising edge of the activation signal from the AND gate 204), a slip calculating IED may record the frequency (FR0=FREQ). FR0 is the fundamental frequency before disconnecting the motor. Further, the slip calculating IED may compute the stop time (T0) as the time the logic gets activated (Tre) minus 12 times the time between samples at the current frequency. This may account for the difference between when the activation circuit 200 sent the activation signal and when the motor actually was stopped. Thus, the stop time (T0) may be computed as $$T0 = Tre - 12/(32*FR0) = Tre - 3/(8*FR0) \qquad \text{Equation 10}$$

Figure 3:
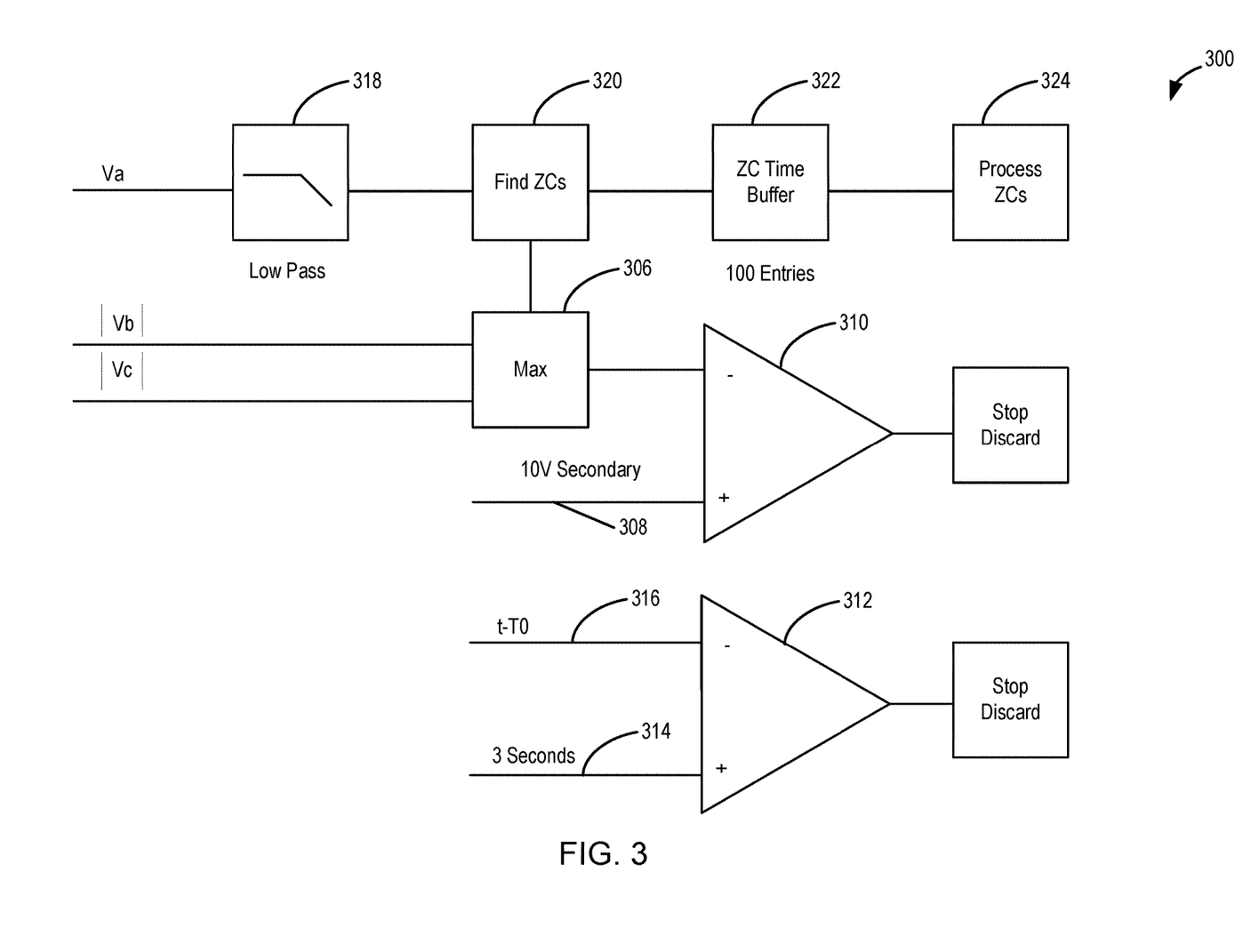
FIG. 3 illustrates a schematic of a circuit for processing zero-crossings in accordance with one embodiment.

The slip calculating IED may also run the logic in FIG. 3.

FIG. 3 illustrates a schematic of a zero-crossing processing circuit 300. The zero-crossing processing circuit 300 may record a target number of zero-crossings after a motor stop. In the illustrated embodiment, the target number of zero-crossing is 100 entries. The zero-crossing processing circuit 300 may use the zero-crossings to compute the frequency changes of the motor after the motor stop.

In the illustrated embodiment, the zero-crossing processing circuit 300 measures the voltage on each phase. The zero-crossing processing circuit 300 may use power transformers and measure the lowered voltage from the power transformers. The zero-crossing processing circuit 300 may be used to measure a Delta y configuration. For example, Va, Vb and Vc may be replaced with VAB, VBC and VCA measurements.

The zero-crossing processing circuit 300 may also check that certain conditions are met to ensure that the measurements are accurate. For example, in the illustrated embodiment, the zero-crossing processing circuit 300 checks that, while a target number of zero-crossings are being recorded, the voltages stay above a threshold voltage 308 and that the zero-crossings occur within a target period of time.

The zero-crossing processing circuit 300 may monitor the maximum voltage of the phases using the maximum element 306. A comparator 310 compares the maximum voltage to a threshold voltage 308. In the illustrated embodiment, the threshold voltage is set at ten volts. If the voltages go below the threshold voltage 308 before the target number of zero-crossings is reached, the zero-crossing processing circuit 300 may stop recording the zero-crossings and discard the currently recorded zero-crossings. In some embodiments, the zero-crossing processing circuit 300 may also clear the full load rotor resistance (R0) and the time to stop the motor to indicate that the logic has failed to obtain these values.

In other words, if the maximum of the absolute values of the Vb, Vc voltages fall below 10V secondary before the target zero-crossings are collected, the zero-crossing processing circuit 300 may: a) stops the logic; b) discards the values; and c) sets R0="----", TTSTOP="----". Thus, the zero-crossing processing circuit 300 may ensure that the voltage magnitude does not decay so fast that the zero-crossing measurements are not accurate.

Similarly, the zero-crossing processing circuit 300 may monitor the time it takes to obtain the target number of zero-crossings. As shown, a comparator 312 may compare a target time period 314 to a current time period 316. The current time period 316 is the time between a current time and the time of the motor stop (e.g., the time during which the zero-crossing processing circuit 300 has been finding zero-crossings). The target time period in the illustrated embodiment is two seconds. If the target number of zero-crossing do not occur before a target time period, the zero-crossing processing circuit 300 may stop recording the zero-crossings and discard the currently recorded zero-crossings. In some embodiments, the zero-crossing processing circuit 300 may also clear the full load rotor resistance (R0) and the time to stop (TTSTP) the motor to indicate that the logic has failed to obtain these values.

In other words, if the target time period expires before the target number of zero-crossings are collected, the zero-crossing processing circuit 300 may: a) stops the logic; b) discards the values; and c) sets R0="----", TTSTOP="----". Thus, the zero-crossing processing circuit 300 may ensure that the voltage magnitude does not decay so fast that the zero-crossing measurements are not accurate.

The zero-crossing processing circuit 300 may include a low-pass filter 318 to filter the voltage signal used to record zero-crossings. In some embodiments, the low-pass filter 318 may be implemented as:

Out[0]=In[0]

Out[$k$]=ALPHA*IN[$k$]+(1−ALPHA)*Out[$k$−1]

where:
$k = 1, 2, 3, \ldots$
ALPHA=0.2

The zero-crossing circuit 300 may further find 320 the zero-crossings of the voltage signal and record the zero crossings in a buffer 322. In some embodiments, the hundred zero-crossings may be stored for processing after the data collection has ended.

A processor 324 may process the recorded zero-crossings to compute the full load rotor resistance (R0) and the time to stop (TTSTP). In some embodiments, if the time of each of the 100 zero crossings are successfully recorded, the processor 324 may compute the time difference between zero crossings. The time differences may be taken between every other zero-crossing. For example, if the time of the zero crossings are labeled $ZC_0, ZC_1, \ldots, ZC_{98}, ZC_{99}$, the processor 324 may compute the 98 time differences as $dt_k = ZC_k - ZC_{k-2}$, for k=2, 3, ..., 98, 99. Further, the processor 324 may Compute the Frequency for each $dt_k$ as $F_k = 1/dt_k$. The processor may associate each frequency measurement ($F_k$) to a zero-crossing time in the middle of the delta time window (i.e., $T_k = ZC_{k-1}$). In other words, the frequency that is computed between every other zero-crossing (frequency across three zero-crossings) may be associated with a zero-crossing in the middle.

In some embodiments, the processor 324 may compute a slope of the frequency decay right after the motor is disconnected. In some embodiments, the first few zero-crossings are not used for calculations to improve accuracy. For example, in the following calculations, the first four zero-crossings are not recorded. For example, the slope of the frequency decay may be determined by solving the following equation:

$$\text{SLOPE\_I} = ((F10-F5)/(T10-T5) + (F11-F6)/(T11-T6) + (F9-F7)/(T9-T7))/3 \qquad \text{Equation 11}$$

Where:
SLOPE_I is the slope of the frequency decay,
$F_x$ is the frequency of a specific sample, and
$T_x$ is the time of the specific sample.

Using the slope of the frequency decay the processor 324 may compute the speed of the rotor at the time of the motor disconnect as:

$$F0 = F_5 + \text{SLOPE\_I} * (T0 - T_5) \qquad \text{Equation 12}$$

Where:
$F_5$ is the closest sample to the motor stop,
T0 is the motor stop time, and
$T_5$ is the time of the closest sample.

In some embodiments, the processor 324 may also compute a measurement error. If the slope between the motor stop and the time of the first zero-crossing is very shallow the error may be small, whereas if the slope is steep the error can be big. Thus, the error may be computed as:

$$\text{Error} = \text{SLOPE\_I} * 1/F0. \qquad \text{Equation 13}$$

Where:
F0 is the speed of the rotor at the time of the motor disconnect, and
SLOPE_I is the slope of the frequency decay In some embodiment, if the error is greater than 32 ms the processor 324 may set $R_O$ to reflect the error (e.g., $R_O$="----").

The process 324 may also compute the slip frequency (Fslip) in hertz based on the fundamental frequency (FR0) and the speed of the rotor at the time of the motor disconnect (F0). For example, Fslip=FR0−F0. The processor 324 may covert the slip frequency to a per unit (pu) value (Slippu) by computing Fslip divided by FR0.

In some embodiments, the processor 324 may estimate the full load rotor resistance $R_O$ based on the slip frequency and the power at which the motor was running right before the motor was disconnected (i.e., power on stop). For example, when the power on stop was a full load, then the $R_O$ may be set to the Slippu value. If the power on stop is less than 0.5 than the $R_O$ may be set to Slippu divided by 0.5. If the power on stop is greater than 1.5 than the $R_O$ may be set to Slippu divided by 1.5. Otherwise, if the power to stop is equal to or between 0.5 and 1.5, in some embodiments, the $R_O$=Slippu/PoSTOP. In some embodiments, if the $R_O$<0.001 OR $R_O$>0.1 than the $R_O$ may be discarded or ignored.

The processor may report the $R_O$ value to a user. For example, the $R_O$ value may be reported in an $R_O$ column of a table. In some embodiments, a thermal model of the motor may be updated automatically using the $R_O$ value.

The processor 324 may also compute the coast time to stop (TTSTOP). The TTSTOP may be the time until the motor reaches a target percentage of the nominal speed (e.g., 10% of a nominal speed). To determine TTSTOP, the processor may calculate an average slope of the frequencies. For example, the processor may compute:

$$\text{SLOPE\_E} = ((F_{99}-F_5)/(T_{90}-T_5) + (F_{70}-F_{20})/(T_{70}-T_{20}) + (F_{90}-F_{60})/(T_{90}-T_{60}))/3$$

Using SLOPE_E, the processor may calculate TTSTOP as $$\text{TTSTOP} = ((FNOM/10) - FR0)/\text{SLOPE\_E}$$

Where:
FNOM is the nominal frequency, and
FR0 is the fundamental frequency before disconnecting the motor The processor may further perform a check to ensure the accuracy of the TTSTOP value. For example, in some embodiments if TTSTOP is less than 5 seconds, the frequency is considered to have decayed too fast to measure and the TTSTOP may be set to zero. If the TTSOP is greater than 180 seconds than the frequency may decay too slow to accurately measure and TTSTOP may be ignored or discarded (e.g., TTSTOP="---").

The processor may report the TTSTOP value to a user. For example, the TTSTOP value may be reported in an TTSTOP column of a table. In some embodiments, a thermal model of the motor may be updated automatically using the TTSTOP value.

Figure 4:
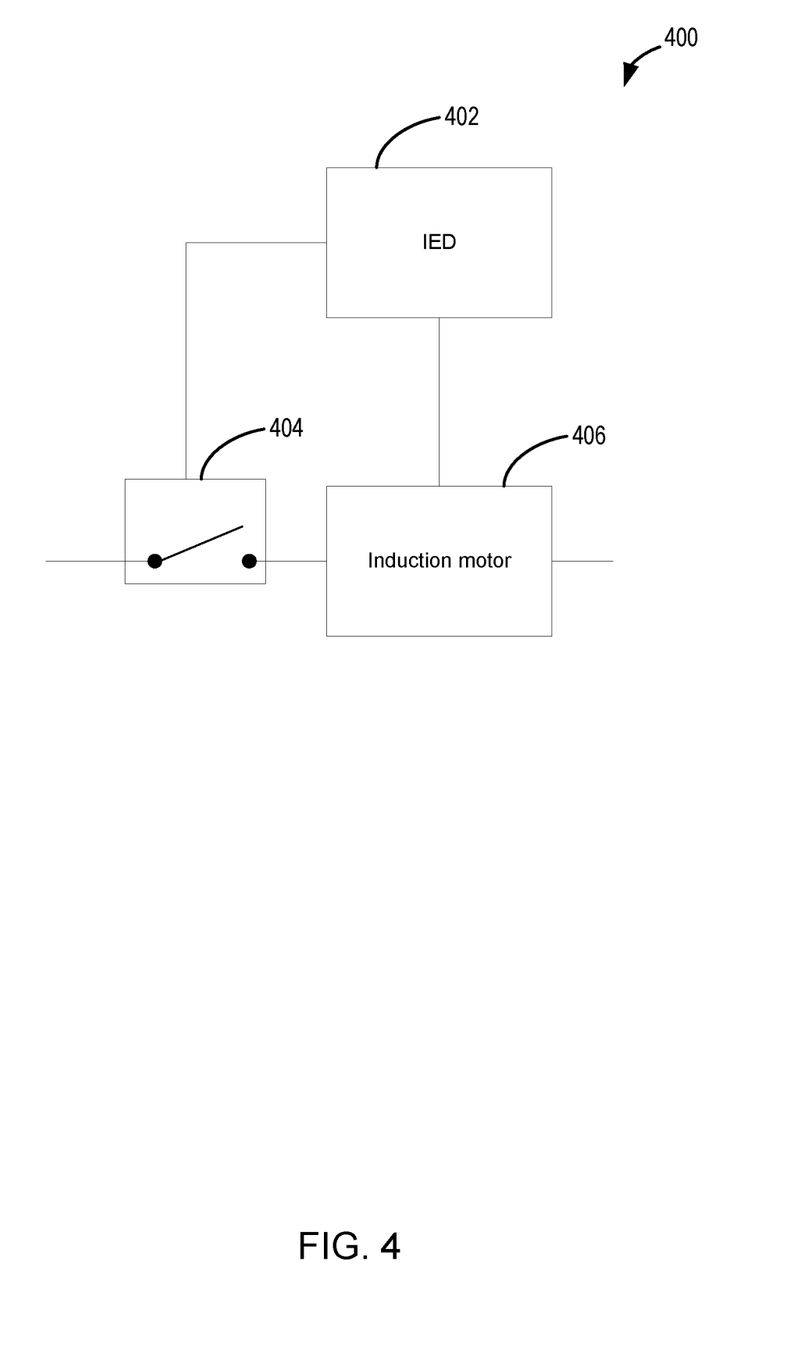
FIG. 4 illustrates a block diagram of an induction motor protection system in accordance with one embodiment.

FIG. 4 illustrates a block diagram of an induction motor protection system 400. The induction motor protection system 400 may include an IED 402 and a breaker 404. The IED 402 may estimate the full load rotor resistance value of the motor 406 and the time to stop of the motor 406. The IED 402 may use current and voltage measurements to calculate a motor slip of the motor 406 based on the estimated full load rotor resistance value as discussed in the previous figures.

In some embodiments, the IED 402 may use the full load rotor resistance value and the time to stop to execute a motor protection process using the motor slip. For example, the IED 402 may use the full load rotor resistance value and the time to stop in a thermal motor to determine when to trip the breaker 404 based on an estimated temperature of the motor 406. As another example, the IED 402 may trip the breaker 404 when the motor slip indicates a locked rotor condition.

Figure 5:
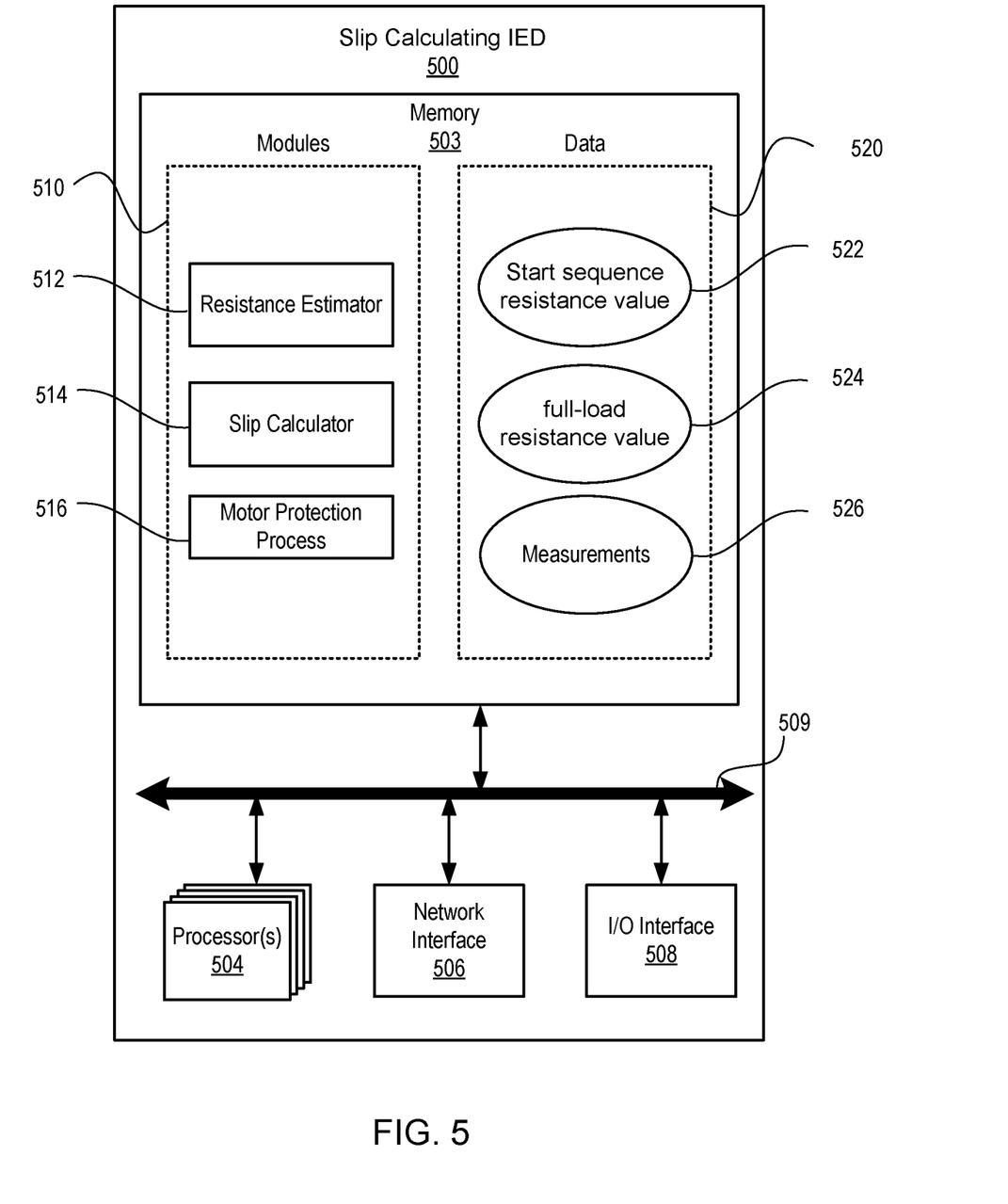
FIG. 5 is a block diagram of a slip calculating IED in accordance with one embodiment.

FIG. 5 is a block diagram of a slip calculating IED 500 according to one embodiment. The slip calculating IED 500 may perform the methods and use the techniques described with reference to the other figures in the specification. The slip calculating IED 500 can include a memory 503, one or more processors 504, a network interface 506, an input/output interface 508, and a system bus 509.

The one or more processors 504 may include one or more general purpose devices, such as an Intel®, AMD®, or other standard microprocessor. The one or more processors 504 may include a special purpose processing device, such as ASIC, SoC, SiP, FPGA, PAL, PLA, FPLA, PLD, or other customized or programmable device. The one or more processors 504 can perform distributed (e.g., parallel) processing to execute or otherwise implement functionalities of the presently disclosed embodiments. The one or more processors 504 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 503 may include static RAM, dynamic RAM, flash memory, one or more flip-flops, ROM, CD-ROM, DVD, disk, tape, or magnetic, optical, or other computer storage medium. The memory 503 may include a plurality of program modules 510 and program data 520. The memory 503 may be local to the slip calculating IED 500, as shown, or may be distributed and/or remote relative to the Slip calculating IED 500.

Data generated or used by the slip calculating IED 500, such as by the program modules 510 or other modules, may be stored on the memory 503, for example, as stored program data 520. The data 520 may be organized as one or more databases.

The data 520 may include a start sequence resistance value 522, full load rotor resistance value 524, and current and voltage measurements 526.

The program modules 510 may include all or portions of other elements of the slip calculating IED 500. The program modules 510 may run multiple operations concurrently or in parallel by or on the one or more processors 504. In some embodiments, portions of the disclosed modules, components, and/or facilities are embodied as executable instructions embodied in hardware or firmware, or stored on a non-transitory, machine-readable storage medium. The executable instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, subsystems, and/or the like.

The modules 510 may comprise a resistance estimator 512, a slip calculator 514, and a motor protection process 516. The resistance estimator 512 may estimate the start sequence resistance value 522 by initiating a start sequence of a motor and measuring the resistance. The resistance estimator 512 may also initiate a motor stop and use the measurements 526 taken after the motor stop to determine the full load rotor resistance value. The slip calculator 514 may use the start sequence resistance value 522, full load rotor resistance value 524, and current and voltage measurements 526 to estimate a slip. And the motor protection process 516 may monitor motor conditions and trip a breaker or relay information to a relay if desired.

The input/output interface 508 may facilitate user interaction with one or more input devices and/or one or more output devices. The input device(s) may include a keyboard, mouse, touchscreen, light pen, tablet, microphone, sensor, or other hardware with accompanying firmware and/or software. The output device(s) may include a monitor or other display, printer, speech or text synthesizer, switch, signal line, or other hardware with accompanying firmware and/or software. For example, in one embodiment, the input/output interface 508 comprises a display to provide a graphical user interface (GUI) illustrating the potential ablation perimeters. The input/output interface 508 can receive the user input data 522. In some embodiments, the input/output interface 508 is a touchscreen, and the size input is received via the touchscreen. In some embodiments, the input/output interface 508 can superimpose the target ablation perimeters on an image of the tissue.

The network interface 506 may facilitate communication with other computing devices and/or networks and/or other computing and/or communications networks. The network interface 506 may be equipped with conventional network connectivity, such as, for example, Ethernet (IEEE 1102.3), Token Ring (IEEE 1102.5), Fiber Distributed Datalink Interface (FDDI), or Asynchronous Transfer Mode (ATM). Further, the network interface 506 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 509 may facilitate communication and/or interaction between the other components of the Slip calculating IED 500, including the one or more processors 504, the memory 503, the input/output interface 508, and the network interface 506.

Figure 6:
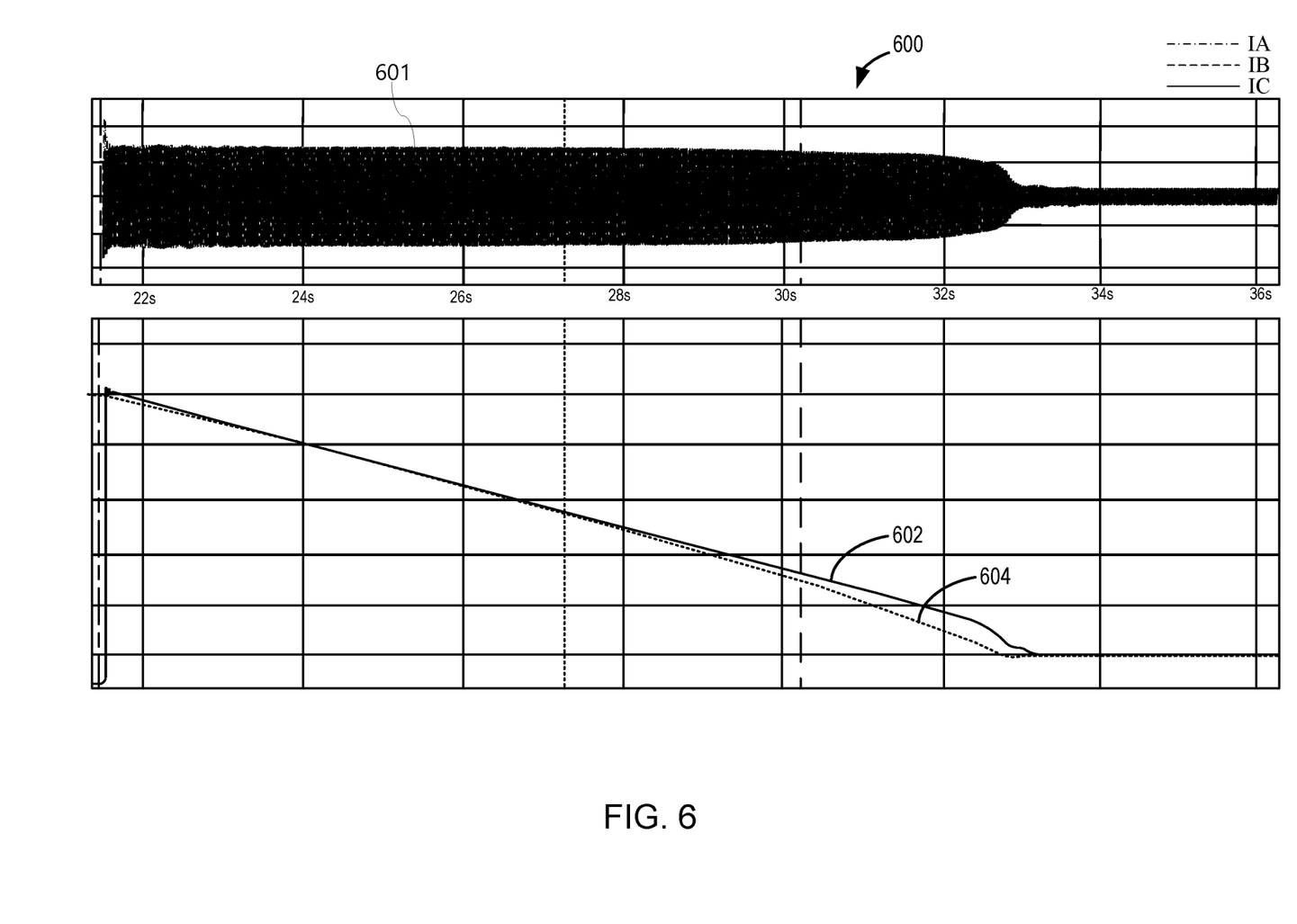
FIG. 6 illustrates a graph of a motor start and a comparison between an actual slip and an estimated slip.

FIG. 6 illustrates a graph of a motor start 600 and a comparison between an actual slip 602 and an estimated slip 604. As shown, the motor current 601 changes from a large amplitude while the motor is running to a small amplitude when the motor stops. The estimated slip 604 was calculated using the techniques described herein. As can be seen, the estimated slip 604 is fairly close to the actual slip 602.

Figure 7:
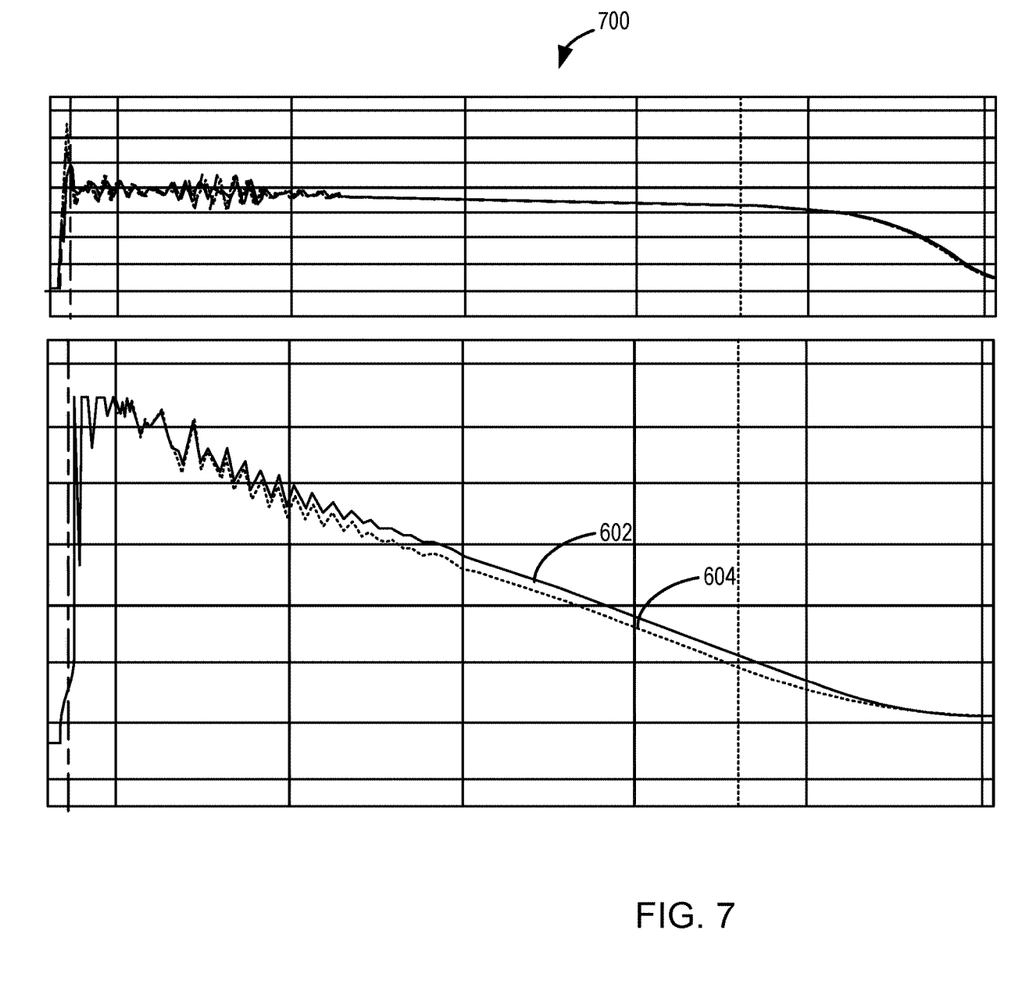
FIG. 7 illustrates a graph of two motor starts and two associated computed slips.

FIG. 7 illustrates a graph of two motor starts 700 and a computed slip 702 for the first motor start and the computed slip 704 for the second motor start. The slips were computed using the techniques described herein. As can be seen the computation can result in fairly repeatable results.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. An intelligent electronic device (IED), comprising:
a memory to store a full load rotor resistance value;
a processor operatively coupled to the memory, wherein the processor is configured to:
before disconnection, estimate the full load rotor resistance value as a function of motor-positive-sequence resistance, and calculate slip using the estimated full load rotor resistance for motor protection;
after disconnection:
acquire motor current and voltage measurements;
measure zero-crossings of the voltage measurements;
compute a time difference between the zero crossings;
compute frequencies of the zero crossings;
compute a slope of a frequency decay using the frequencies and a time of the zero crossings;
compute a motor speed based on the slope;
compute a slip frequency based on the motor speed;
estimate the full load rotor resistance using the slip frequency;
calculate motor slip using the acquired motor current and voltage measurements and the estimated full load rotor resistance value; and
execute a motor protection process using the calculated motor slip.

2. The IED of claim 1, wherein the processor is further configured to determine the motor positive-sequence resistance at a beginning of a start sequence of a motor, and wherein the motor slip is calculated further using the determined motor positive-sequence resistance at the beginning of the start sequence.

3. The IED of claim 1, wherein the full load rotor resistance value is estimated by solving:

$$R_0 = K(R_p(1))$$

where:
K is ⅓, and
$R_p(1)$ is the motor positive-sequence resistance at a time when the slip is one.

4. The IED of claim 1, wherein the processor is further configured to:
record a frequency after the motor disconnect, and
compute a motor stop time to be: a logic activation time minus twelve multiplied by a time between samples at the frequency.

5. The IED of claim 1, wherein the processor is further configured to:
record a target number of zero-crossings after the motor disconnect;
discard the zero-crossings if the voltages go below a threshold voltage before the target number of zero-crossings is reached;
discard the zero-crossings if the target number of zero-crossing do not occur before a target time period.

6. The IED of claim 1, wherein the processor is further configured to determine a time period from the time the motor is disconnected until the motor reaches a target percentage of the nominal speed based on the zero-crossings.

7. The IED of claim 1, wherein the motor protection process includes locked rotor detection.

8. The IED of claim 1, wherein the motor protection process includes updating a thermal model.

9. A method for an IED, the method comprising:
estimating a full load rotor resistance value as a function of motor-positive-sequence resistance;
acquiring motor current and voltage measurements;
measuring zero-crossings of the voltage measurements;
computing a time difference between the zero-crossings;
computing frequencies of the zero crossings;
computing a slope of a frequency decay after the motor is disconnected using the frequencies and a time of the zero crossings;
computing a motor speed based on the slope;
computing a slip frequency based on the motor speed;
estimating the full load rotor resistance value using the slip frequency;
calculating motor slip using the acquired motor current and voltage measurements and the estimated full load rotor resistance value; and
executing a motor protection process using the calculated motor slip.

10. The method of claim 9, further comprising determining the motor positive-sequence resistance at a beginning of a start sequence of a motor, and wherein the motor slip is calculated further using the determine the motor positive-sequence resistance at the beginning of the start sequence.

11. The method of claim 9, wherein the full load rotor resistance value is estimated by solving:

$$R_0 = K(R_p(1))$$

where:
  K is ⅓, and
  $R_p(1)$ is the motor positive-sequence resistance at a time when the slip is one.

12. The method of claim 9, further comprising:
recording a frequency after the motor disconnect, and
computing a motor stop time to be: a logic activation time minus twelve multiplied by a time between samples at the frequency.

13. The method of claim 9, further comprising:
recording a target number of zero-crossings after the motor disconnect;
discarding the zero-crossings if the voltages go below a threshold voltage before the target number of zero-crossings is reached;
discarding the zero-crossings if the target number of zero-crossing do not occur before a target time period.

14. The method of claim 9, further comprising determining a time period from the time the motor is disconnected until the motor reaches a target percentage of the nominal speed based on the zero-crossings.

15. The method of claim 9, wherein the motor protection process includes locked rotor detection.

16. The method of claim 9, wherein the motor protection process includes updating a thermal model.

17. An intelligent electronic device (IED), comprising:
a memory to store a full load rotor resistance value;
a processor operatively coupled to the memory, wherein the processor is configured to:
  upon disconnection:
    acquire motor current and voltage measurements;
    measure zero-crossings of the voltage measurements;
    compute a time difference between the zero crossings;
    computer frequencies of the zero crossings;
    compute a slope of a frequency decay using the frequencies and a time of the zero crossings;
    compute a motor speed based on the slope;
    compute a slip frequency based on the motor speed;
    estimate the full load rotor resistance using the slip;
    calculate motor slip using the acquired motor current and voltage measurements and the estimated full load rotor resistance value; and
    execute a motor protection process using the calculated motor slip.

18. The IED of claim 17, wherein the full load rotor resistance is estimated using a power on stop value.

19. The IED of claim 17, wherein the full load rotor resistance is used to calculate motor slip following connection.

\* \* \* \* \*